US008220653B2

(12) United States Patent
Carballido

(10) Patent No.: US 8,220,653 B2
(45) Date of Patent: Jul. 17, 2012

(54) LID WITH A DETACHABLE SEALING JOINT AND MANUFACTURING METHOD THEREOF

(75) Inventor: Jose Luis Martinez Carballido, Nuevo Leon (MX)

(73) Assignee: Fabricas Monterrey, S.A. De C.V., Monterrey, Nuevo Leon (MX)

( * ) Notice: Subject to any disclaimer, the term of this patent is extended or adjusted under 35 U.S.C. 154(b) by 441 days.

(21) Appl. No.: 11/937,807

(22) Filed: Nov. 9, 2007

(65) Prior Publication Data

US 2008/0110891 A1     May 15, 2008

(30) Foreign Application Priority Data

Nov. 10, 2006   (MX) ..................... NL/a/2006/000088

(51) Int. Cl.
 *B65D 41/00*          (2006.01)
(52) U.S. Cl. ..................... 220/359.1; 215/328; 215/327; 215/346
(58) Field of Classification Search .................. 215/324, 215/327, 348, 12.1, 333, 326, 337, 328, 346; 220/309.1, 309.2; 428/66.3, 66.4
See application file for complete search history.

(56) References Cited

U.S. PATENT DOCUMENTS

| 3,002,641 | A | * | 10/1961 | Normandy | 215/348 |
|---|---|---|---|---|---|
| 3,195,754 | A | * | 7/1965 | Brockett | 215/328 |
| 3,257,021 | A | * | 6/1966 | Brockett | 215/328 |
| 3,325,035 | A | * | 6/1967 | Strickman | 215/348 |
| 3,557,987 | A | * | 1/1971 | Singer, Jr. | 215/230 |
| 3,633,781 | A | * | 1/1972 | Zapata | 215/328 |
| 3,669,691 | A | * | 6/1972 | Long et al. | 26/102 |
| 3,799,380 | A | * | 3/1974 | Hashimoto et al. | 215/341 |
| 3,892,905 | A | * | 7/1975 | Albert | 428/220 |
| 3,910,445 | A | * | 10/1975 | Garza et al. | 215/328 |
| 4,111,323 | A | * | 9/1978 | Ichinose et al. | 215/230 |
| 4,130,213 | A | * | 12/1978 | Wszolek | 215/349 |
| 4,157,143 | A | * | 6/1979 | Doi | 215/228 |
| 4,256,234 | A | * | 3/1981 | Mori et al. | 215/343 |
| RE30,573 | E |   | 4/1981 | Ichinose et al. | |

(Continued)

FOREIGN PATENT DOCUMENTS

GB          2060657 A       5/1981

(Continued)

*Primary Examiner* — Mickey Yu
*Assistant Examiner* — Kareen Rush
(74) *Attorney, Agent, or Firm* — Reinhart Boerner Van Deuren P.C.

(57) ABSTRACT

A lid with a detachable sealing joint, the lid having a crown-type shell having an inner surface and an external surface, a sealing joint upon the inner surface of the shell; a detachable hydrophilic coating; and a coating compatible with the sealing joint upon the detachable hydrophilic coating; such that the detachable hydrophilic coating and the compatible coating form an adhesive interface between the crown and the sealing joint. The detachable hydrophilic coating having at least a water solid polymer, for example polyvinyl pyrrolidone; at least a cross-linking agent, for example, butanediol; and at least a solvent, for example, water. It also describes a method for manufacturing a lid with a detachable sealing joint and a method for bottling beverages using lids with a detachable sealing joint of the invention. The aforementioned to provide a lid with a sealing joint possessing a weaken joint when weakening the adhesive capacity of the detachable hydrophilic coating, as of the moment on which said coating contacts the humidity of the bottle product and thus, easing the detachment of the sealing joint along with the prize mark printing.

12 Claims, 2 Drawing Sheets

U.S. PATENT DOCUMENTS

| | | | | |
|---|---|---|---|---|
| 4,304,707 | A * | 12/1981 | Kuehn | 524/325 |
| 4,310,100 | A * | 1/1982 | Kunimoto et al. | 215/228 |
| 4,390,658 | A * | 6/1983 | Graetz et al. | 524/512 |
| 4,403,003 | A | 9/1983 | Backhouse | |
| 4,539,363 | A * | 9/1985 | Backhouse | 524/460 |
| 4,785,952 | A * | 11/1988 | Obadia | 215/329 |
| 4,838,442 | A * | 6/1989 | Merry | 215/228 |
| 4,896,781 | A * | 1/1990 | Simard | 215/328 |
| 4,968,514 | A * | 11/1990 | Forbes | 426/106 |
| 5,381,914 | A * | 1/1995 | Koyama et al. | 215/341 |
| 5,542,557 | A * | 8/1996 | Koyama et al. | 215/347 |
| 5,779,073 | A * | 7/1998 | Milhomme | 215/232 |
| 2003/0129334 | A1 * | 7/2003 | Carballido | 428/35.7 |
| 2004/0182047 | A1 * | 9/2004 | Thierjung et al. | 53/421 |
| 2005/0067367 | A1 * | 3/2005 | Carballido | 215/324 |
| 2006/0180607 | A1 * | 8/2006 | Guzmann et al. | 222/54 |
| 2007/0298246 | A1 * | 12/2007 | Carballido | 428/332 |

FOREIGN PATENT DOCUMENTS

| | | |
|---|---|---|
| JP | 55090539 | 7/1980 |
| JP | 01-278340 | 11/1989 |
| JP | 11-005942 | 1/1999 |
| JP | 2000-019877 | 1/2000 |
| JP | 2000-290585 | 10/2000 |
| JP | 2001-019876 | 1/2001 |
| WO | WO 97/29968 A1 | 8/1997 |

* cited by examiner

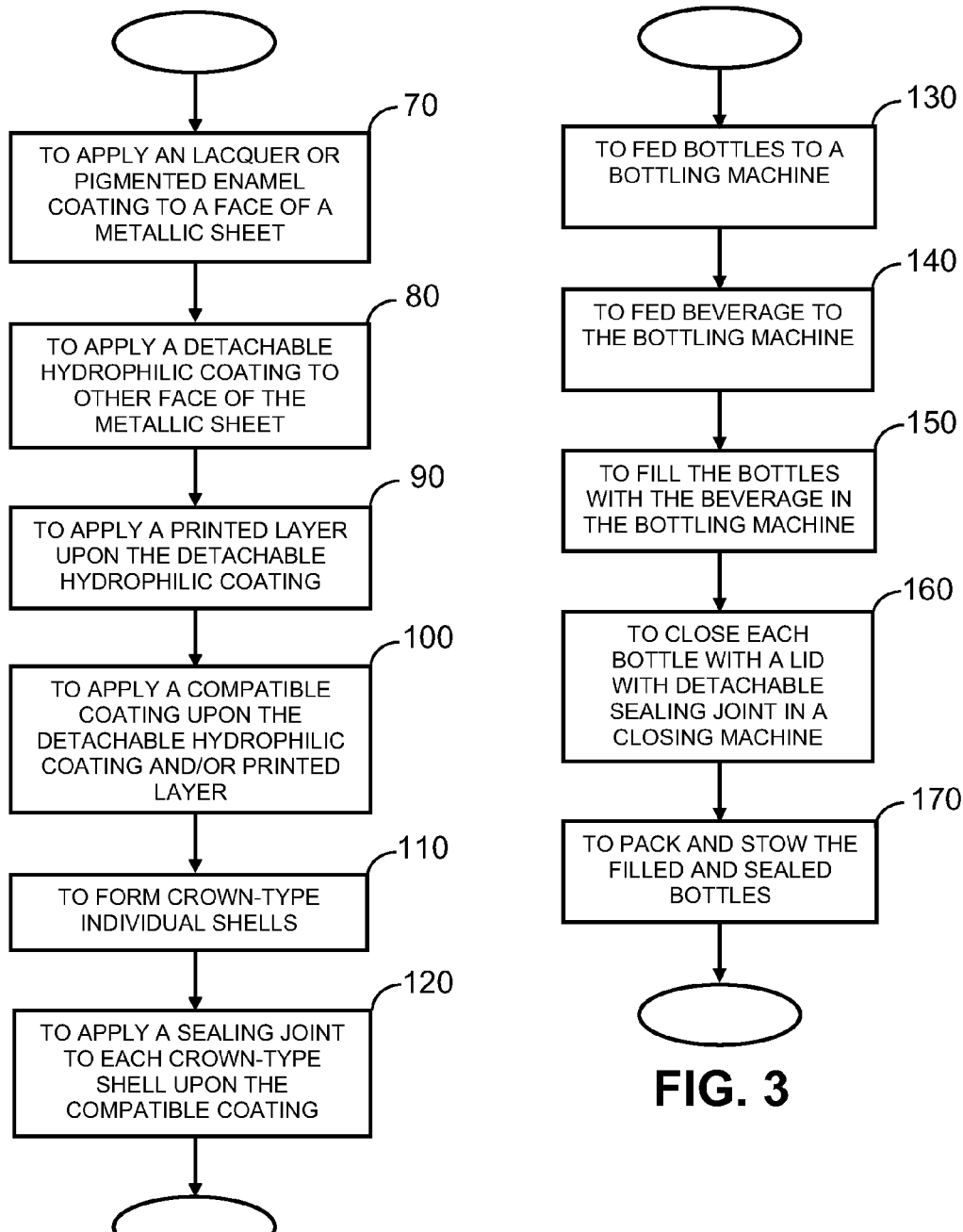

LID WITH A DETACHABLE SEALING JOINT AND MANUFACTURING METHOD THEREOF

CROSS-REFERENCE TO RELATED PATENT APPLICATIONS

This patent application claims priority to pending Mexican Patent Application No. NL/a/2006/000088, filed Nov. 10, 2006.

FIELD OF THE INVENTION

The present invention refers to lids with detachable joints. Consequently, the invention refers to a lid with a detachable sealing joint, where the sealing joint is a attached to the inner surface of the shell in the form of a crown through and interface of a detachable hydrophilic covering and a compatible covering, such that the adhesive capacity of the detachable hydrophilic covering is weaken when contacting humidity of the container or product and allows to detach easily the sealing joint as of said moment.

BACKGROUND OF THE INVENTION

Lids, also well-known as hermetic lids, crowns, metal bottle tops, or flat bottle caps, are generally made of metallic materials and are used to close glass or metal containers, which are used to pack, for example, carbonated drinks or non carbonated drinks, such as beer, sodas, juices, etc. Generally, a lid is comprised by a metallic shell in whose interior or inner part is located a sealing joint to hermetically or tightly seal the container and to retain its inner pressure.

Currently, for advertising and sales promotion purposes of bottle products or with identification purposes thereof, such as the batch number, manufacturing date, production installation, etc., it has been a frequent practice to close hermetically or tightly containers with the containers bottle tops with metallic lids which inner surface is printed with indications such as "prize", "keep participating" or other combinations of letters, characters, symbols or drawings. In systems on which commercialization of packed products and similar, is made with a bonus inside, frequently, the modality according to which a buyer of the product has to return the predetermined amount of sealing joints return, or a sealing joint that has printed a wining mark, in exchange for which there is a prize sent to the buyer, is adopted.

The usual practice for manufacturing a crown-type metallic lid with a prize inside, consists on preparing a lacquer or enamel entire coating or covering, in a face of a metallic sheet and to print, for example, the bottler's name, in the other face with pigmented enamels, so that the sheet presents a series of impressions upon it. Then, the individual crowns disks are formed and are transformed in rugged flaps lids punching. Afterwards, to the inner surface of the crown, after printing the marks of the prize, a semi-adhesive lacquer coat is even applied, which capacity to stick or adhere to the sealing joint is weak. Then, a measure amount of plastic is added, or another elastomer substance that may not contain vinyl polychloride, which is extended upon the inner surface weather making the rotation of the crown upon it self or conforming it for a molding die in hot, to establish a desirable sealing joint which posses a weak joint to the inner covering of lacquer, to ease detachment together with the impression of prize mark.

Examples of current practices to manufacture detachable sealing joints lids are described in the following patent documents:

Brockett Halford, in the American Patent U.S. Pat. No. 3,257,021, describes a method to manufacture a metallic lid with a detachable sealing joint, through the application of a lacquer coat of metallic-sheet face, and the ulterior re-cooking thereof, the application of a layer of indications in plastic to this lacquer and heating to melt it completely, the formation of the sheet in a crown with the in name of lacquer inside thereof, the plastisol deposit in the crown and molding by heat and pressure molding to completely melt and to configure the sealing joint and to make the adherence thereof to these indications layer and this lacquer, thus, establishing the adherence between the lacquer and the crown with a lesser intensity to adherence between the sealing joint and the plastisol layers with the indications.

Isao Ichinose Go Kunimoto and Fumiomori Noboru Suzuki, in the Mexican patent MX-148964, describe a lid with a detachable sealing joint, the lid consists of a crown having two components: a layer of printing material in its inner surface and a polyolephene coating, applied in the inner part of the crown, such that the printing material layer also includes two components comprising a bottom coating layer container polyethylene oxide and a top coating layer containing, in time, polyethylene oxide and at least another compatible resin providing a printing layer of such that the stump of printing material to indications in the interface between lower coating layers and the top coating of the final coating layer.

Isao Ichinose Go Kunimoto and Fumiomori Noboru Suzuki in the Mexican patent MX-152564, describes a lid for a container or a container provided with a detachable seal joint and which comprises a crown formed by a cover metallic plate and a thermoplastic resin sealing joint applied to the inner surface of the crown. The sealing joint is attached to the crown through a detachable adhesive interface between a layer comprised by a hydrocarburated or natural resin which is locally applied to a limited area of the inner face of the crown, to have a lesser diameter than that of the crown or the sealing joint. A layer comprising an epoxy resin formed upon the hydrocarburated or natural resin layer, surrounding and overlapped to this layer and which is superimposed to this layer.

Enrico Folchini, Marziano Schiaretti and Fabricio Michelini, in the European patent EP-0820410, describes a lid with a detachable sealing joint for food containers including a crown, in such that may be adapted to the recipient opening, and a sealing joint free of vinyl polychloride, having an inscription, joint to the bottom part of the crown, and able to seal the recipients opening; the sealing joint is attached to the bottom part of the crown lid applying an adhesive paint between the bottom and the sealing joint; this paint, which may be used to control adherence of the sealing joint at the bottom part, is comprised by a mixture of synthetic resins and hydrocarbons, with a metallic pigment added; a film with an inscription is applied upon the paint, said inscription made of ink that has a physical-chemical affinity with the sealing joint materials; so that, it is easy to separate the sealing joint of the lids bottom, upon which the inscription is clearly reproduced.

Likewise, the present inventor, in the publication of the Mexican patent application MX-NL/2002/000040, describes a metallic lid having a crown with an external and inner surface, having both at least a coating enamel, a detachable sealing joint contacting the part of the inner surface of the crown; and a printed film comprising a polyester ink, superimposed between the inner surface of the crown and the sealing joint; wherein the sealing joint comprises a vinyl polychloride resin, wherein the printed film is in direct contact with the sealing joint and the coating enamel of the inner surface.

Currently, the restriction or limitation that lids with detachable sealing joints have, is the low adherence feature, of coating or adhesive layers that attach the sealing joint to the bottom of the crown, immediately entering into action, this is, the sealing joint starts to be detached once it is applied at the bottom of the crown, for which during the manufacturing process, the packing, storage, storing and stowed and placement as a lid during bottling, inconvenient origin when finding the crowns closing joint totally or partially detached (removed).

According to the above described, and in order to offer a solution to the limitation found with current lids with detachable sealing joints, it is necessary to provide a lid with a detachable sealing joint which coating or adhering layer is attached to the bottom of the crown, keeping its entire adhesive capacity during the manufacturing process, packing, stowed, storing and placement of the lid, but with this adhesive capacity starting to weak as of the moment in which the sealing joint is in contact with the bottle product or packed product, so that afterwards, it may be detached easily by the consumer.

SUMMARY OF THE INVENTION

According to the preceding and in order to have a solution to the limitations found, the purpose of the invention is to offer a lid with a detachable sealing joint, wherein the lid has a shell where the lid has a crown-type shell, having an inner and external surface; a sealing joint upon the inner surface of the shell; a detachable hydrophilic covering; and a covering compatible with the sealing joint upon the detachable hydrophilic covering; in such that the detachable hydrophilic covering and the compatible covering form an adhesive interface between the shell and the sealing joint.

It is also an object of the present invention to offer a method for manufacturing lids with detachable sealing joints, the method having the steps for the application of a detachable hydrophilic covering upon a metal-shell face; applying a coating compatible upon the detachable hydrophilic covering; cutting and forming the metallic sheet covered in shells in the form of a crown with an inner an external surface, such that detachable hydrophilic covering and a compatible covering are placed in the inner surface of said crown; and applying a sealing joint to the shell upon a compatible covering.

Along with the above mentioned, it is also an object of the present invention to offer a composition for a detachable hydrophilic coating, whose adhesive capacity is weaken at the moment of contacting humidity, the composition having at least a water-soluble polymer, at least, a cross linking agent; and at least, a solvent.

It is also an object of the present invention to offer a method for preparing a composition for a detachable hydrophilic coating, the method having the steps of dissolving in a solvent at least, a water-soluble polymer; and add at least, a cross-linking agent to the aqueous solution.

Finally, it is an object of the present invention to offer a method for bottling beverages, the method having the steps of feeding a bottling machine with a series of bottles; feeding the bottling machine with a beverage; feeding a closing machine with the series of lids with a detachable sealing joint; bottling, in the bottling machine, the beverage within the bottles; and closing in the closing machine, each one of the bottles with each one of the lids with a detachable sealing joint; such that the lid with detachable sealing joint is formed by a shell in form of a crown, having an inner and external surface; a sealing joint upon the inner surface of the shell; a detachable hydrophilic covering; and a covering compatible with the sealing joint upon the detachable hydrophilic covering, where the detachable hydrophilic covering and the compatible covering form and adhesive interface between the shell and the sealing joint.

BRIEF DESCRIPTION OF THE DRAWINGS

The characteristic details of the invention are described in the following paragraphs along with the figures attached hereto, which are the purpose of defining the invention, but without limiting the scope thereof.

FIG. 2 shows a block diagram of a method for manufacturing lids with detachable sealing joints, according to the present invention.

FIG. 3 shows a block diagram of a method for bottling beverages using lids with detachable sealing joint, according to the invention.

DETAILED DESCRIPTION OF THE INVENTION

Figure 1:
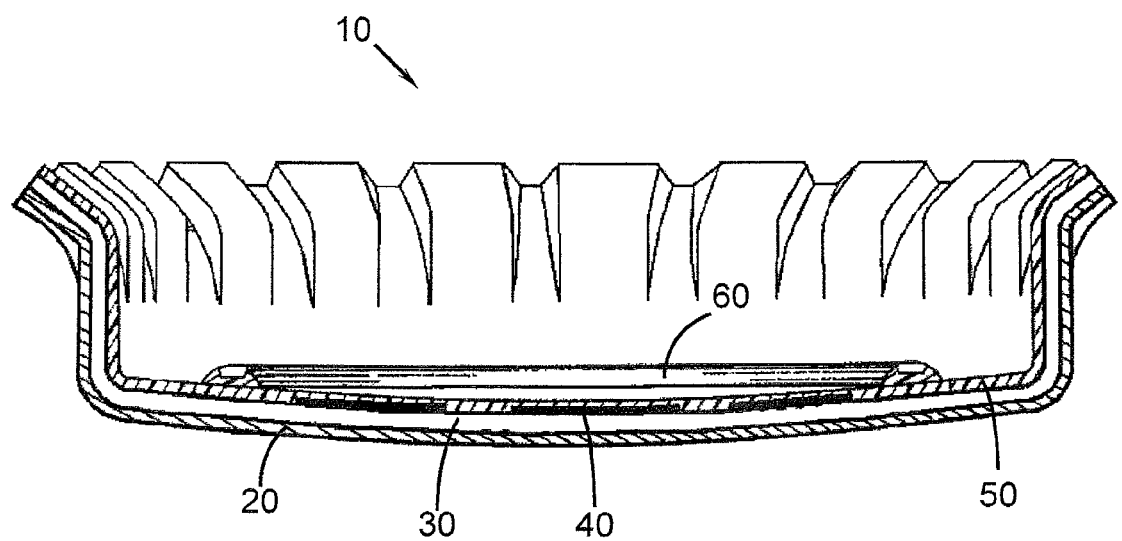
FIG. 1 shows a sectional view of a lid with a detachable sealing joint, according to the invention.

The term "detachable hydrophilic coating", as used in the context of the present specification, means a coating layer, adhering to a metallic substrate that is formed of one or several films having the characteristic of absorbing water or being swelled with water at normal temperatures and whose adherence capacity is weakened when entering into contact with humidity; likewise, having the affinity of diffusing at least a corrosion-inhibiting agent, found dispersed at least in the same layer, upon the metallic substrate surface being exposed.

The term "compatible coating" is used under the meaning of a coating layer formed by one or several films having the function of being permeable to humidity, ornamental, impact resistant, adherent to the detachable hydrophilic coating and a printed layer, likewise being the means in which a sealing joint is fixed, when having the physical-chemical affinity with the materials of the sealing joint and with the materials of the printed layer ink.

With reference to FIG. 1, a sectional view of a metallic lid with a detachable sealing joint according to the present invention is illustrated. The metallic lid 10 is formed by a shell 20 in a crown-type form with an external and an inner surface, the latter is coated by at least a detachable hydrophilic 30 and of at least a compatible coating 50, and upon the compatible coating 50 there is a sealing joint 60 attached thereto. Between the detachable hydrophilic coating 30 and the compatible coating 50, there is a printed layer 40 with a dye-inscription having a physical-chemical affinity with the compatible coating 50 materials, and with the sealing joint 60.

Both, the detachable hydrophilic coating 30 and the compatible coating 50, form an adhesive interface between the sealing joint 60 and the shell 20, so that the adhesive capacity of the detachable hydrophilic coating 30 is weakened when contacting humidity from the bottled product that passes through the sealing joint 60 and the compatible coating 50, so that the sealing joint 60 along with the printer layer 40 may be easily removed by the consumer.

The thickness of the detachable hydrophilic coating 30 is generally in a range of 3 μm to 200 μm. When the thickness of the detachable hydrophilic coating 30 is less than 3 μm, the desired ability of spreading out upon the surface of the metallic substrate, is not necessarily obtained; on the other hand, when the thickness exceeds the 200 μm, defects may take place with the formation and compatibility with the printed layer 40 and the compatible coating 50; as well as a decreasing on the adherence capacity to the metallic substrate.

The thickness of the compatible coating 50 is generally within a range of 1 µm to 200 µm. When the thickness of the compatible coating 50 is less than 1 µm, the desired ability of containing the detachable hydrophilic coating 30 and of resistance is not necessarily obtained; on the other hand, when the thickness exceeds the 200 µm defects in the formation of metallic lid 10 may occur, when having loosing in this way the flexibility and thus, the formation of possible fractures or fissures in this coating.

I. Detachable Hydrophilic Covering Composition

The present invention is not particularly limited to a composition, to form a detachable hydrophilic coating upon the surface of a metallic substrate, but, preferably, the use of a composition is suggested to form a detachable hydrophilic coating of an aqueous solution based upon one or more water-soluble polymers and one or more cross linking agents to keep the solution. The hydrophilic coating can be formed, upon a metallic substrate, from a unique layer or film, or may be formed by the subsequent application of two or more layers or films that may have the same or different composition.

Water-Soluble Polymer

The water-soluble polymer, used in the composition of the detachable hydrophilic coating, may be classified in natural, semi-synthetic and synthetic polymers.

Examples of natural polymers are included: starch, gelatin, casein, vegetable rubber, among others. Examples of semi-synthetic polymers are included cellulose derivatives, such as: methyl, ethyl cellulose, carboxymethyl cellulose, hydroxymethyl cellulose, among others. Examples of synthetic polymers are included, vinyl polymers, such as: polyvinyl pyrrolidone, polyvinilic alcohol, polyvinyl methyl ether, hydroxyl athyl metacrylate, acrylic acid, metal acrylic acid, and derivatives, monomers with acrylic or metal acrylic acid and its derivatives among others.

In a preferred embodiment of the invention, of the water soluble polymers described above, the use of polyvinyl pyrrolidone in a range of 5% by weight to 20% by weight is suggested.

Cross Linking Agent

Among the typical examples of cross linking agents that may be used in the composition of the detachable hydrophilic coating of the invention, including butanediol, ethylene glycol, dyethylene glycol, triethylen glycol, propylene glycol, polyethylene glycol, glycerin, trimethylol propane, pentaerithrytol, polyoxyethylene glycol, polyoxypropylene glycol, polyoxyethylene glycol, among others.

In a preferred embodiment of the invention, the use of butanediol in a range of 0.5% by weight to 5% by weight is suggested.

Solvent

The composition of detachable hydrophilic coating is produced by dissolving or spreading by water the components of the composition, in order to form an aqueous solution.

In a preferred embodiment of the invention, a water range of 40% by weight to 95% by weight is suggested.

In an alternative embodiment of the invention, as a solvent, the butyl-cellulose, iso-propilic alcohol or N-methyl pyrrolidone may be used.

Other Components

The composition for the detachable hydrophilic coating according to the invention, may also contain, if it is necessary or desirable, catalyzer such as, for example, phosphoric acid or paratoluensulphonic acid in a range up to 1% by weight.

Along with the above mentioned, the composition for detachable hydrophilic coating may include a dispersed corrosion-inhibiting agent, including zinc compounds, preferably, zinc salt both, organic and inorganic and combinations thereof, particularly water, soluble zinc salts, such as zinc halogenides, zinc nitrates, zinc sulphates, zinc chromates, zinc silicates, and complex compounds thereof, constituting the inorganic zinc salts, contemplated in the invention. Among the organic salts of zinc including, for example zinc bluconate, zinc tartrate, zinc formate, zinc phenol sulphonate, zinc salicilate, zinc succinate, zinc glycerosphate, zinc aspartate, zinc picolinate, and other zincs salts, formed with amino acids, as wall as combinations thereof. Among the zinc halogenides are included, for example, zinc chloride, zinc bromide, zinc iodide, zinc fluoride and mixtures thereof.

In a preferred embodiment of the invention, zinc citrate is used, in a range of 1% by weight to 20% by weight.

Preparation Mode

The composition for detachable hydrophilic coating is prepared firstly, by dissolving the water soluble polymer in water, keeping it under continuous shacking, next, the cross linking agent is added to the aqueous solution, and seal shacking, optionally, the catalyzer is added, obtaining an aqueous solution, commonly called resin solution.

In an alternative embodiment and if desirable, separately, the zinc salt is dissolved in water with an adequate concentration, and finally, mixing the zinc salt solution obtained with the resins solutions until obtaining a homogenous mixture.

Application Mode

The detachable hydrophilic coating may be applied, upon the surface of a metal or substrate or plastic material substrate, through ordinary coating application means, for example, by sprinkling, immersing, brushings, rollers, etc., followed by a natural drying or thermal drying. The detachable hydrophilic coating may be applied to the entire surface of the metallic substrate or of the plastic material thereof, or depending on the purposes, partially applying it only to a face or portion of the metallic substrate or plastic material substrate.

II. Compatible Coating Composition

The present invention is not limited to a composition in particular to form a compatible coating upon the detachable hydrophilic coating, but preferably, the use of a conventional coating composition is suggested, which may be applied to the decoration of metallic substrate and whose composition may be based on the epoxy, epoxy-esters, polyesters, vinylic acrylic, polyurethanes, epoxy phenylic compounds and combinations thereof, mixed with cross linking agents and additives that promote adherence to the material of the sealed joint.

Examples of coatings compositions that may be used as a compatible coating on the invention may be described in the documents of Japanese patents JP-2001019876, JP-200019877, JP-2000290585, JP-11005942, JP-1278340 and in Mexican patents MX-148964, MX-153545, MX-154100, MX-156469, MX-157641 and MX-179165.

The compatible coating may be formed upon the detachable hydrophilic coating, from only one film or layer or to be formed by the constant application of two or more layers or films that may have the same or different composition.

Application Mode

The compatible coating may be applied upon the detachable hydrophilic coating, through common means of coating application, for example, by sprinkling, immersing, brush, rollers, etc., followed by a natural or thermal drying or by UV radiation.

Referring now to FIG. 2, a block diagram is illustrated, for methods for manufacturing lids with a detachable sealing joint, according to the invention. Firstly, in the step 70, a lacquer or pigmented enamel coating is applied to a face of metallic sheet where there is a printed serially, for example, the bottler's name, followed by drying at temperature of approximately of 392° F. Then, in the step 80, a detachable hydrophilic coating is applied upon the other face of the metallic sheet, which is dried at a temperature of approximately 392° F. Next, or alternatively, in the step 90, we apply a printer layer with an alternate series of inscriptions with printed with dying indicating for example, "prize", "keep participating", "exchange by", "the code is", etc. upon the detachable hydrophilic coating. Later, in the step 100, a compatible coating is applied upon the detachable hydrophilic coating and/or or printed layer, which is dried at a temperature of approximately 392°.

Next, in the step 110, the sheet, coated in both faces, is cut in a plurality of disks to form crown-type individual shells with an inner surface and at an external surface, such that detachable hydrophilic coating, the printed layer and the compatible coating lay upon the inner surface of the crown. Finally, in the step 120, a sealing joint is applicable to each of the shells upon the compatible coating. This sealing joint application may be produced when adding a measure amount of plastisol or organosol or another elastomer substance, that may comprise vinyl polychloride or free thereof, extending upon the inner surface or rotating the crown upon its axis, or conforming it by a hot-molding dye to establish a desirable sealing joint, having a weak joint when the adhesive capacity of the detachable hydrophilic coating is weakened, and as of that moment, when this coating contacts humidity from the bottled product and easing the detachable hydrophilic coating along with the impression of the prize marked, being the case.

The invention will be detailed through the following examples:

Metallic substrates formed each by different MR-type steel sheets (referred as sample 1, 2, 3 and 4), which are degreased and prepared for the application of the detachable hydrophilic coating of the invention.

Each of the steel sheets (samples 1, 2, 3 and 4) was coated; then, with a detachable hydrophilic coating with the composition illustrated by Table 1 to a temperature of 68° F., then dried at a temperature of 392° F., for 9 min.

TABLE 1

| Components | Sample 1 | Sample 2 | Sample 3 | Sample 4 |
|---|---|---|---|---|
| Polyvinyl Pyrrolidone (% by weight) | 5 | 10 | 15 | 20 |
| Butanediol (% by weight) | 0.5 | 2 | 3.5 | 5 |
| Water (% by weight) | 93.5 | 87 | 80.5 | 74 |
| Phosphoric acid (% by weight) | 1 | 1 | 1 | 1 |
| Detachable hydrophilic coating thickness (μm) | 10 | 10 | 10 | 10 |

Further, upon the detachable hydrophilic coating applied to each of the steel sheets, (samples 1, 2, 3 and 4), a coating is added, compatible with composition shown in Table 2, to a temperature of 68° F., being dried at a temperature of 392° F., for 9 min.

TABLE 2

| Components | Sample 1 | Sample 2 | Sample 3 | Sample 4 |
|---|---|---|---|---|
| Phenolic resin (% by weight) | 10 | 15 | 20 | 25 |
| Epoxy resin (% by weight) | 10 | 15 | 20 | 25 |
| Vinylic resin (% by weight) | 5 | 10 | 15 | 20 |
| Phosphoric acid (% by weight) | 1 | 2 | 3 | 5 |
| Butyl-Cellusolve (% by weight) | 74 | 58 | 42 | 25 |
| Compatible coating thickness (μm) | 20 | 20 | 20 | 20 |

Following, each of the steel sheets are dye-machined and formed in lids, individual-crown lids, along with the sealing joint, which elastomer composition is appropriate, according to compatible coating. The lids thus formed are used to close carbonated beverages or non carbonated beverages. Afterwards, they are left to rest for a minimum period of 48 hours, during which saturated humidity internally existing in the beverage, crosses the sealing joint and the compatible coating, weakening the adherence of the detachable hydrophilic coating.

After said time, the bottled product is opened and the lids are detached from its sealing joint manually. Table 3 shows the following observations:

TABLE 3

| Time (hours) | Sealing Joint Adherence | Result |
|---|---|---|
| 0 | Complete adherence | There is no detachment |
| 12 | Complete adherence | There is no detachment |
| 18 | Partial adherence | A 40% of the printing is detached and transferred |
| 24 | Partial adherence | A 60% of the printing is detached and transferred |
| 30 | Partial adherence | A 80% of the printing is detached and transferred |
| 36 | Partial adherence | A 90% of the printing is almost fully detached and transferred |
| 48 | Partial adherence | A 100% of the printing is detached and transferred |

Regarding now to FIG. 3, a block diagram of a method to bottle beverages using lids with a detachable sealing joint, according to the invention, is showed. Firstly, in the step 130, a series of bottles coming from a washing machine are operated by a conveyor belt to be fed to a bottling machine, the bottles when entering the bottling machine make a circular turn. Simultaneously, in step 140, the bottling machine is fed with the beverage to be bottled. Later, in the step 150, the filling operation of bottles with the beverage is made in the bottling machine through a nozzles system that fills the bottle with the beverage that previously has been entered into a feeding hop from which it is distributed by a set of pipelines and valves towards the nozzles. Then, in step 160, once the bottle has been filled, it goes out to a closing machine where it is closed under pressure with a seal with the detachable sealing joint of the invention (see FIG. 1), which previously has been fed, along with the series of lids, a feeding hop of the closing machine. Finally, in the step 170, the filled and sealed bottles are guided by a conveyor belt to the process of packing and stowing.

Based on the alternatives previously described, it is contemplated that amendments to the above described compositions and embodiments, as well as the application and alternative composition are considered as evident for those skilled in the art under the following description. However, it is contemplated that claims cover said modifications and alternatives within the scope of the present invention.

What is claimed is:

1. A lid including:
   a crown-type shell having an inner surface and an external surface, and
   a detachable sealing joint upon said inner surface of said crown-type shell; and wherein the improvement comprises:
   a detachable hydrophilic coating based on water-soluble polymer adhered to said inner surface of said crown-type shell; and
   a compatible coating permeable to humidity and adhered to said detachable sealing joint and said detachable hydrophilic coating;
   wherein said detachable hydrophilic coating and said compatible coating form an adhesive interface between said inner surface of said crown-type shell and said detachable sealing joint, whose adherence capacity of said detachable hydrophilic coating is weakened when entering into contact with humidity.

2. The lid according to claim 1, wherein further said detachable hydrophilic coating based on water-soluble polymer comprises:
   a cross linking agent; and
   a solvent.

3. The lid according to claim 1, wherein said water-soluble polymer is selected from the group consisting of starch, gelatin, casein, vegetable rubber, methyl cellulose, ethyl cellulose, carboxymethyl cellulose, hydroxymethyl cellulose, polyvinyl pyrrolidone, polyvinylic alcohol, polyvinyl methyl ether, hidroxyethyl methacrylate, acrylic acid, metal acrylic acid and derivatives, acrylic or metal acrylic acid monomers and derivatives, and mixtures thereof.

4. The lid according to claim 3, wherein said water-soluble polymer is polyvinyl pyrrolidone within a range of approximately 5% by weight to approximately 20% by weight.

5. The lid according to claim 2, wherein said cross linking agent is selected from the group consisting of butanediol, ethylene glycol, diethylene glycol, triethylene glycol, propylene glycol, polyethylene glycol, glycerin, trimethylol propane, pentaerytrol, polyoxyethylene glycol, polyoxypropylene glycol, polyoxyethylenepolyoxypropylene glycol, and mixtures thereof.

6. The lid according to claim 5, wherein said cross linking agent is butanediol, within a range of approximately 0.5% by weight to approximately 5% by weight.

7. The lid according to claim 2, wherein said solvent is selected from the group consisting of water, buthyl-cellosolve, iso-propilic alcohol, N-methyl pyrrolidone, and mixtures thereof.

8. The lid according to claim 7, wherein said solvent is water within a range of approximately 40% by weight to approximately 95% by weight.

9. The lid according to claim 1, wherein said detachable hydrophilic coating has thickness within a range of 3 μm to 200 μm.

10. The lid according to claim 1, wherein said compatible coating is based on compound selected from the group consisting of epoxy compounds, epoxy-ester, polyester, vinyl, acrylic, polyurethanes, epoxy phenolic compounds, and combinations thereof.

11. The lid according to claim 1, wherein said compatible coating has a thickness within a range of 1 μm to 200 μm.

12. The lid according to claim 1, wherein further includes a printed layer between said detachable hydrophilic coating and said compatible coating.

* * * * *